UNITED STATES PATENT OFFICE.

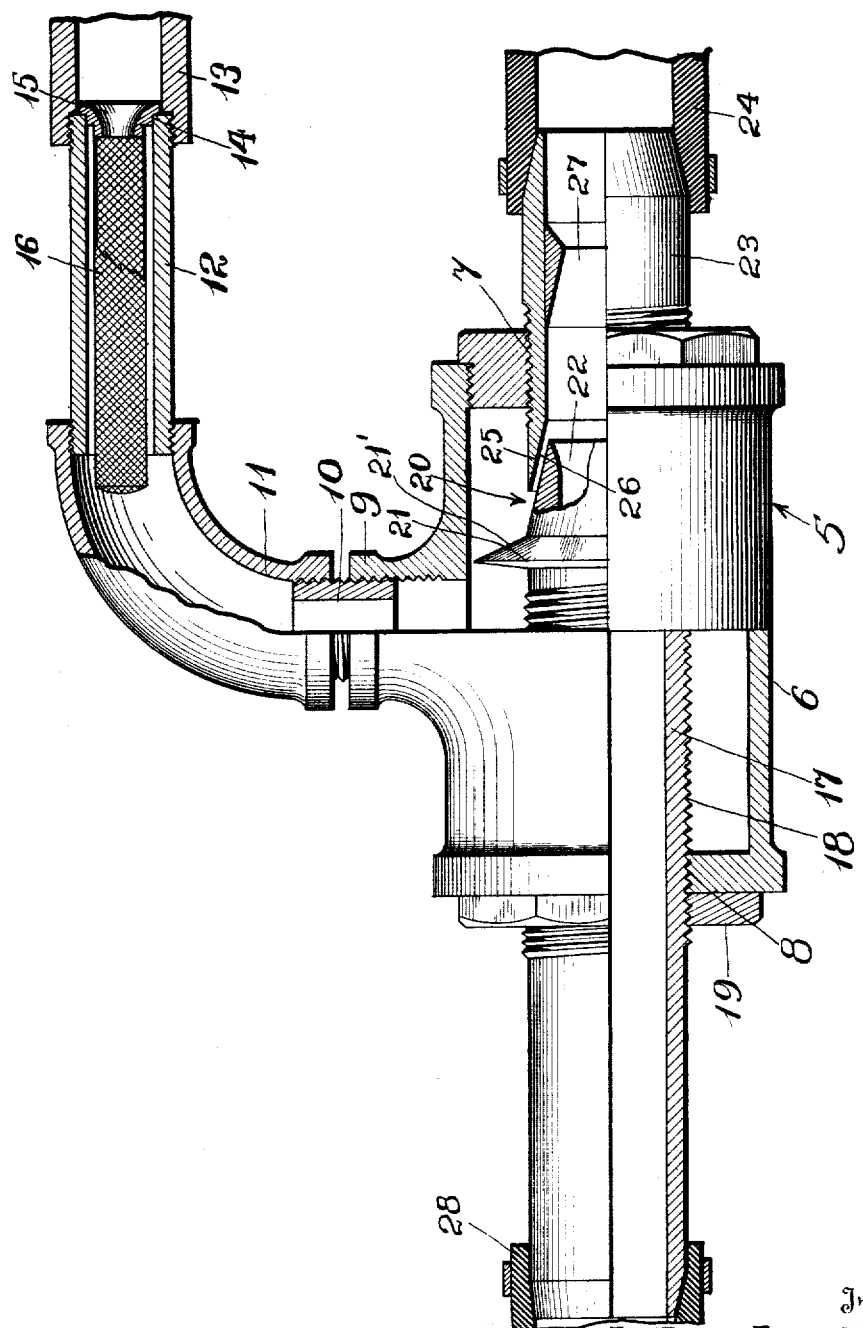

PHILIPPE L. DES JARDINS, OF ST. LOUIS, MISSOURI.

SUCTION-CREATING APPARATUS.

1,233,991. Specification of Letters Patent. Patented July 17, 1917.

Application filed August 24, 1916. Serial No. 116,652.

*To all whom it may concern:*

Be it known that I, PHILIPPE L. DES JARDINS, a citizen of the United States, residing at St. Louis, State of Missouri, have invented certain new and useful Improvements in Suction-Creating Apparatus, of which the following is a specification.

My invention relates to improvements in suction creating machines for cleaning carpets and the like, wherein a suction or vacuum is produced by injecting compressed air into the pipe line.

An important object of the invention is to provide improved means for injecting compressed air into the pipe line, in a manner to produce a jet which is substantially concentric with relation to the longitudinal axis of the pipe line, whereby a maximum, even, and continuous suction or vacuum is produced in such pipe line.

A further object of the invention is to provide means for causing the jet of compressed air to focus at a point spaced a substantial distance from the discharge end of the nozzle or air passage, whereby the efficiency in operation of the apparatus is increased.

A further object of the invention is to provide novel and simple means for straining the compressed air prior to its entrance into the pipe line.

Other objects and advantages of the invention will be apparent during the course of the following description.

In the accompanying drawing forming a part of this specification and in which reference characters are employed to designate parts throughout the same, The figure is a side elevation of the apparatus, parts being shown in central longitudinal section.

In the drawing, wherein for the purpose of illustration is shown a preferred embodiment of my invention, the numeral 5 designates an injector valve-structure as a whole, comprising an outer casing 6, the opposite ends of which are provided with screw-threaded openings 7 and 8, for a purpose to be described. This outer casing 6 is provided with a tubular extension or nipple 9, upon one side thereof, having screw-threaded engagement with a thimble or coupling 10, connected with an elbow 11. Having screw-threaded engagement with the opposite end of the elbow 11 is a tubular coupling 12, connected with a pipe 13, which leads to a source of compressed air (not shown) such as a compressed air storage tank or an air compressor.

The tubular coupling 12 has one end provided with a shoulder 14, receiving a beveled ring 15, to which is secured a tubular or sack strainer 16. The function of this strainer is to prevent dirt or other particles, carried by the compressed air, from entering the injector valve-structure.

Arranged within the outer casing 6 is a longitudinally adjustable tubular nozzle 17, having exterior screw-threads 18, for engagement within the screw-threaded opening 8. Arranged upon the screw-threads 18 is a clamping nut 19, adapted to engage the outer end of the casing 6, to lock the nozzle 17 in adjustment at the desired position. The tubular nozzle 17 has its outlet end exteriorly tapered, as shown at 20, and decreasing in diameter outwardly. Arranged adjacent the base or inner end of the exteriorly tapered end of the nozzle 17 is an exterior annular upset flange or rib 21, as shown. The outer surface of this flange is tapered and decreases in diameter outwardly, as shown at 21'. The tubular nozzle 17 has the outlet end of its bore tapered, as shown at 22, and increases in diameter outwardly.

The numeral 23 designates a tubular shell, having its inner end exteriorly screw-threaded to engage within the screw-threaded opening 7 and its outer end engages with an outlet pipe 24. The intake end of the bore of the tubular shell 23 is tapered, as shown at 25, and increases in diameter inwardly toward the casing 6, the portion 25 having the same taper as the exterior surface 20, whereby these two surfaces or walls remain parallel during the longitudinal adjustment of the nozzle 17, providing an annular air passage 26. This passage 26 is concentric with relation to the longitudinal axis of the tubular nozzle 17, tapered, and decreases in diameter outwardly with respect to the casing 6. The inner bore of the shell 23 is further provided with an annular focusing rib or flange 27, tapered as shown, and arranged a substantial distance from the passage 26.

Having engagement with the intake end of the nozzle 17 is an intake pipe 28, which may be a flexible hose or the like, with a suction nozzle (not shown) secured to its intake end.

The operation of the apparatus is as follows:

The compressed air is fed through the pipe 13 and passes through the strainer 16, and is there deprived of the dust and dirt. The compressed air passes through the elbow 11 and associated elements into the outer casing 6. In the absence of the annular upset flange 21, the compressed air thus supplied into the casing 6 would discharge unevenly through the passage 26, the greater volume of the air passing through the side of the passage adjacent the tubular extension 9. The result of this uneven discharge of air through the passage 26 is to focus the jet of compressed air to one side of the bore of the tubular shell 23, such jet being eccentric to the longitudinal axis of the nozzle 17, and causing an uneven suction in the pipe 28. In addition to this, the compressed air, and the air drawn in after it through the pipe 28, which is laden with dust, are caused to unduly contact with the inner wall of the pipe 24 and associated elements, thereby unnecessarily increasing the friction between the same. The upset flange 21 serves to retard or baffle the free passage of the air, when first entering the casing 6, causing it to pass evenly, through all portions of the passage 26. By this means the compressed air jet discharging from the passage 26 is concentric with the longitudinal axis of the nozzle 17. The passage 26 is preferably disposed at a slight angle with relation to the longitudinal axis of the nozzle, whereby the compressed air jet is focused at a point spaced a substantial distance from the outlet end of the nozzle 17. I have discovered that by arranging the passage 26 at the slight angle, and thus bringing the focus of the jet farther from the discharge end of the nozzle 17, the tendency of the jet to retard the passage of the incoming air through the pipe 28 is minimized. The function of the flange or rib 27 remotely located with relation to the passage 26 is to focus the jet at a point remote from the outlet end of the passage 26, thus increasing the suction power of the apparatus.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In apparatus of the character described, the combination with a casing provided with a tapered outlet opening decreasing in diameter outwardly, of means for supplying compressed air to the casing at a point remote from the outlet opening, a nozzle having a portion thereof arranged within the casing and its outlet end exteriorly tapered and decreasing in diameter outwardly and extending into the outlet opening of the casing to form with the wall of such outlet opening a contracted air passage which is substantially annular in cross-section and converges outwardly, the exteriorly tapered outlet end of the nozzle extending rearwardly beyond the tapered outlet opening for a substantial distance, and imperforate upset flange arranged within the casing at the rear end of the tapered outlet end of the nozzle and rearwardly of the tapered air passage and forwardly of the compressed air supply means, and an inlet pipe connected with the intake end of the nozzle.

2. In apparatus of the character described, the combination with a casing provided at one end with a tapered air outlet opening decreasing in diameter forwardly; of means for supplying compressed air into one side of the casing at a point remote from the outlet opening; a nozzle extending longitudinally within the casing and having its discharge end exteriorly longitudinally tapered and decreasing in diameter forwardly and projecting into the tapered air outlet opening for forming with its wall a tapered air passage which is substantially annular in cross-section and converges forwardly, the exteriorly tapered discharge end of the nozzle extending rearwardly beyond the tapered opening for a substantial distance; an imperforate annular upset flange arranged upon the exterior of the nozzle adjacent the base of the exteriorly tapered end thereof, rearwardly of the tapered air passage and forwardly of the compressed air supply means; and an inlet pipe connected with the intake end of the nozzle.

3. In apparatus of the character described, a casing provided upon one side with compressed air inlet means; a tubular shell extending into one end of the casing and having the intake end of its bore tapered and decreasing in diameter forwardly; a tubular nozzle extending longitudinally through the casing with one end arranged exteriorly of the opposite end of the casing, said tubular nozzle having the outlet end of its bore tapered and increasing in diameter forwardly and the exterior surface of its outlet end tapered and decreasing in diameter forwardly, said exteriorly tapered outlet end projecting into the tapered bore of the tubular shell and extending rearwardly beyond the same for a substantial distance; and annular imperforate upset flange disposed at the base of the tapered outlet end of the nozzle, rearwardly of the tubular shell and forwardly of the compressed air inlet means; and an inlet pipe connected with the outer end of the tubular nozzle.

4. In apparatus of the character described;

the combination with a casing provided upon one side with compressed air inlet means; of a tubular shell leading into one end of the casing and having the intake end of its bore tapered and decreasing in diameter outwardly from the casing, said tubular shell being provided outwardly of the tapered intake end of said bore with an interior annular focusing flange having a conical bore decreasing in diameter outwardly; a tubular nozzle extending longitudinally within the casing and having the outlet end of its bore tapered and increasing in diameter outwardly, said nozzle having its exterior surface tapered adjacent the tapered portion of its bore and decreasing in diameter outwardly and projecting into the tapered bore of the tubular shell, said tubular nozzle being provided adjacent the base of its exterior taper with an annular upset flange; and an inlet pipe connected with the outlet end of the tubular nozzle.

In testimony whereof I affix my signature in presence of two witnesses.

PHILIPPE L. DES JARDINS.

Witnesses:
LOUIS P. DES JARDINS,
A. E. GANAHL.

Copies of this patent may be obtained for five cents each, by addressing the "Commissioner of Patents, Washington, D. C."